United States Patent Office 2,904,600
Patented Sept. 15, 1959

2,904,600

STABILIZATION OF CHLORINATED HYDROCARBONS

Harry B. Copelin, Niagara Falls, N.Y., assignor to E. I. du Pont de Nemours and Company, Wilmington, Del., a corporation of Delaware No Drawing. Application April 4, 1956
Serial No. 575,944

14 Claims. (Cl. 260—652.5)

This invention relates to the stabilization of chlorinated hydrocarbons. More particulraly, it relates to preventing the generation of acidity in trichlorethylene and perchlorethylene. In one aspect, the invention is concerned wtih a process for preventing the accumulation of acid in these chlorinated hydrocarbons. In another aspect, it is concerned with chlorinated hydrocarbons containing various additives to repress this acid accumulation.

Chlorinated hydrocarbons have many industrial uses. For example, perchlorethylene and trichlorethylene are particulraly valuable for use in the vapor degreasing of metals. Unfortunately, these compounds are somewhat unstable and gradually decompose on exposure to heat, air and metal surfaces yielding acid products such as hydrogen chloride. Heretofore small quantities of addition agents have been added to stabilize the chlorinated hydrocarbons or to neutralize acidic decomposition products.

The present invention is concerned primarily with addition agents which serve as acid acceptors or antacids. Generation of hydrogen chloride is particularly undesirable in vapor degreasing since it corrodes the metal articles being degreased with formation of metal chlorides which, in turn, further accelerate the decomposition reaction. Hydrogen chloride may also result from the decomposition of the chlorinated cutting oils frequently removed from metallic workpieces in the degreasing process.

In the past, organic amines, such as pyridine, were found to be particularly valuable as antacids for use in the degreasing process. However, the use of these amines is limited both by economic and technical considerations. A high amine content accelerates removal of hydrogen chloride from solvent molecules with the formation of corrosive amine hydrochlorides which etch aluminum and adversely affect the zinc coatings used in many degreasers. Also, free amines tend to disappear in the presence of copper or copper alloys, probably due to the formation of a metal complex. These disadvantages of amine additives are particularly noticeable at high temperatures. They are especially acute when perchlorethylene is used as a degreasing solvent because of its high boiling point. Perchlorethylene boils at approximately 121° C. which is some 35° C. higher than trichlorethylene.

An object of this invention is to provide a new and improved method of stabilizing chlorinated hydrocarbons, trichlorethylene and perchlorethylene in particular.

Another object of the invention is to provide an improved method of stabilizing perchlorethylene with non-alkaline additives.

A further object is to provide a method of stabilizing perchlorethylene against the generation of hydrogen chloride and other acidic impurities therein.

The above-mentioned and still further objects of this invention may be achieved by use of a synergistic combination of an amide and an organic epoxide. These compounds act cooperatively as an extremely effective acid acceptor many times more effective than either agent when used alone. This synergistic combination is also outstanding in that it is non-alkaline and has none of the disadvantages pertaining to amine additives.

The epoxides of this invention are in general organic oxides having the configuration:

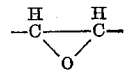

The preferred compounds are those having relatively short aliphatic carbon chains, e.g., up to about ten carbon atoms in length. Suitable epoxides include propylene oxide, butylene oxide, amylene oxide, cyclohexene oxide and others. Halogen substituents in the carbon chain are perfectly acceptable, epichlorhydrin or chloropropylene oxide, for example, yielding excellent results.

The amides employed in this invention are derived from saturated one to five carbon atom fatty acids and may contain up to two saturated alkyl substituents on the amide nitrogen. They have the general formula, RCONR′R″, in which R represents hydrogen or a saturated alkyl group containing up to four carbon atoms. R′ and R″ represent up to two hydrogen atoms or alkyl groups or one polymethylene group, containing a total of not more than 6 carbon atoms. Since polymethylene radicals are bivalent, substitution therewith forms a saturated heterocyclic ring containing one nitrogen atom. Functioning amides include formamide, propionamide and valeramide as well as N-alkyl derivatives such as N-methyl acetamide, N-dipropyl butyramide, N-acetyl pyrrolidine and N-formyl piperidine. The substituted amides are preferred in the practice of this invention because of their higher solubility in the chlorinated solvents.

For practical purposes, the number of carbon atoms in the epoxide and amide additives is limited so as not to include compounds with extremely high boiling points. Such additives are lost when the chlorinated solvent is distilled and stabilizers which distill with the solvent are preferred. However, in this connection, it must be pointed out that N-substituted amides containing one or two of the lower alkyl substituents are lower boiling than the corresponding unsubstituted amides. This is illustrated by the boiling point data report for substituted formamides:

| | B.P. in ° C. |
|---|---|
| Formamide | 210 |
| N-methyl formamide | 180–5 |
| N-dimethyl formamide | 153 |
| N-ethyl formamide | 197–9 |
| N-diethyl formamide | 177–8 |

Dimethyl formamide, which is a preferred additive, forms a low boiling azeotrope (B.P. 119° C.) with perchlorethylene in which the amide concentration is 10%. Although all amide additives have higher boiling points than the degreasing solvents in which they are employed, the small proportions involved will normally distill over with the solvent provided their boiling point is not too far removed from that of the solvent.

The epoxide and amide components of the synergistic stabilizing combinations of this invention are added to the chlorinated solvent in small but effective stabilizing amounts, viz. 0.001 to 5% by weight of solvent. Usually 0.001 to 1% by weight of epoxide and 0.001 to 1% by weight of amide are suitable.

The invention may be understood in more detail from the following examples in which all percentages are by weight unless otherwise noted. All pH values were determined on the aqueous extract obtained from an equal volume of the sample concerned.

EXAMPLE 1

This example shows the use of synergistic amide-epoxide combinations as acid acceptors during refluxing of a chlorinated hydrocarbon.

A series of six samples of trichlorethylene was prepared and refluxed first for 120 hours and then for an additional 50 hours. pH values were measured after the two reflux periods. The composition of the samples and the effectiveness of the additives as indicated by pH values after the two reflux periods are shown in Table I.

*Table I*

| Sample | Additives | pH Following Reflux | |
|---|---|---|---|
| | | 120 Hrs. | 170 Hrs. |
| 1 | 0.2% Dimethyl formamide | 3.0 | 2.4 |
| 2 | 0.2% Cyclohexene oxide | 3.2 | 2.7 |
| 3 | 50-50 mixtures of samples (1) and (2). | 5.3 | 5.2 |
| 4 | 0.5% Diethyl formamide | 4.2 | 4.1 |
| 5 | 0.5% Epichlorhydrin | 3.7 | 2.9 |
| 6 | 50-50 mixtures of samples (4) and (5). | 6.1 | 6.6 |

As will be seen from the results in this table, the combination of amides and epoxides prevents the development of acidic impurities in the solvent even after prolonged refluxing. As a result, the stabilized solvent compositions remain in the pH range 5 to 7.

EXAMPLE 2

This example shows the use of the synergistic substituted amide-epoxide combinations with perchlorethylene. A series of 5 samples were prepared for this reflux test. A chlorinated cutting oil, known by the proprietary name "Clorafin" 40, plus a small amount of powdered iron was added to simulate commercial degreasing conditions in these experiments. The original composition of the samples and the change in pH on refluxing is shown in Table II.

*Table II*

| Sample | Additives | Initial pH | Reflux Period, hrs. | Final pH |
|---|---|---|---|---|
| 1 | 0.6% Epichlorhydrin, 1% Dimethyl formamide. | 4.9 | 86 | 6.8 |
| 2 | 0.6% Epichlorhydrin | 4.8 | 86 | 3.8 |
| 3 | 0.6% Epichlorhydrin, 0.02% Dimethyl formamide. | 4.9 | 146 | 6.3 |
| 4 | 0.6% Epichlorhydrin, 0.2% Dimethyl formamide. | 4.9 | 146 | 6.9 |
| 5 | 1% Dimethyl formamide | 4.8 | 80 | 3.2 |

Results shown in the table indicate the utility of the substituted amide-epoxide combinations in preventing the accumulation of acid when perchlorethylene is refluxed in the presence of a cutting oil under conditions similar to those that would be encountered in commercial degreasing.

EXAMPLE 3

This example compares a series of amides alone and in synergistic combination with the epoxide, epichlorhydrin. Solvent degradation was measured by titrating the acid formed.

A 250 ml. sample of perchlorethylene containing 15% by weight "Clorafin" 40 cutting oil and a trace of iron powder was employed in each test. The perchlorethylene also contained 0.022 to 0.028% N-methyl pyrrole antioxidant. The results are shown in Table III. Duplicate experiments were carried out in the first 16 tests.

*Table III*

| Sample | Additives | Reflux Period, hrs. | Ml. NHCl Formed (Calc. from titer) | |
|---|---|---|---|---|
| 1 | None | 23 | 1.05 | 0.97 |
| 2 | 0.5% Epichlorhydrin | 23 | 0.32 | 0.40 |
| 3 | 0.5% Formamide | 23 | 1.02 | 0.92 |
| 4 | 0.5% Formamide, 0.5% Epichlorhydrin. | 350 | 0.003 | 0.005 |
| 5 | 0.25% Formamide, 0.25% Epichlorhydrin. | 23 | 0.05 | 0.005 |
| 6 | 0.5% Dimethyl formamide | 23 | 0.85 | 1.34 |
| 7 | 0.5% Dimethyl formamide, 0.5% Epichlorhydrin. | 264 | 0.005 | 0.000 |
| 8 | 0.25% Dimethyl formamide, 0.25% Epichlorhydrin. | 166 | 0.03 | 0.03 |
| 9 | 0.5% Acetamide | 23 | 0.95 | 2.05 |
| 10 | 0.5% Acetamide, 0.5% Epichlorhydrin. | 64 | 0.010 | 0.000 |
| 11 | 0.25% Acetamide, 0.25% Epichlorhydrin. | 86 | 0.000 | 0.000 |
| 12 | 0.5% Methyl acetamide | 20 | 1.08 | 0.65 |
| 13 | 0.25% Methyl acetamide, 0.25% Epichlorhydrin. | 23 | 0.020 | 0.040 |
| 14 | 0.5% Dimethyl acetamide | 23 | 2.15 | 1.90 |
| 15 | 0.5% Dimethyl acetamide, 0.5% Epichlorhydrin. | 64 | 0.010 | 0.005 |
| 16 | 0.25% Dimethyl acetamide, 0.25% Epichlorhydrin. | 86 | 0.010 | 0.020 |
| 17 | 0.5% Dimethyl propionamide | 23 | 1.36 | |
| 18 | 0.5% Dimethyl propionamide, 0.5% Epichlorhydrin. | 64 | 0.035 | |
| 19 | 0.25% Dimethyl propionamide, 0.25% Epichlorhydrin. | 86 | 0.010 | |
| 20 | 0.5% Dimethyl butyramide | 23 | 1.05 | |
| 21 | 0.5% Dimethyl butyramide, 0.5% Epichlorhydrin. | 64 | 0.005 | |
| 22 | 0.25% Dimethyl butyramide, 0.25% Epichlorhydrin. | 86 | 0.040 | |

It may be noted that the amide-epoxide synergism of this invention is not appreciably affected by certain other additives included in perchlorethylene and trichlorethylene. Thus, for example, N-methyl pyrrole and ethyl acetate, known preservatives for chlorinated hydrocarbons can be included along with an amide and an epoxide in a single sample of the solvent.

Other variations in the exemplified aspects of this invention can be made without departing from the spirit thereof. More than one amide can, for example, be used in the same sample of chlorinated hydrocarbons together with a single epoxide. Alternatively, two epoxides can be combined with one amide or even with two or more amides. Since no particular advantage occurs from such complex combinations, they are not preferred.

Having now described my invention, I claim:

1. The method of inhibiting the accumulation of acidic products in a liquid degreasing chlorinated hydrocarbon by supplying thereto a synergistically cooperative stabilizing combination comprising small but effective stabilizing amounts of an epoxide containing between two and ten carbon atoms, selected from the group consisting of unsubstituted aliphatic hydrocarbon epoxides and aliphatic hydrocarbon epoxides containing substituent halogen atoms, and an amide of a one to five carbon atom unsubstituted aliphatic fatty acid containing N-substituents selected from the group consisting of hydrogen, alkyl and polymethylene radicals, said N-substituents containing a total of not more than 6 carbon atoms.

2. The method of claim 1 in which the chlorohydrocarbon is trichlorethylene.

3. The method of claim 1 in which the chlorohydrocarbon is perchlorethylene.

4. The method of claim 3 in which the N-substituted formamide is dimethyl formamide.

5. The method of stabilizing perchlorethylene against the formation of acidic products during metal degreasing, the step of supplying thereto a synergistically cooperative combination comprising 0.001 to 1% by weight of cyclohexene oxide and 0.001 to 1% by weight of dimethyl formamide.

6. The method of stabilizing perchlorethylene against the formation of acidic products by supplying thereto a synergistically cooperative combination comprising 0.001 to 1% by weight of epichlorhydrin and 0.001 to 1% by weight of dimethyl formamide.

7. The method of stabilizing perchlorethylene against the formation of acidic products by supplying thereto a synergistically cooperative combination comprising 0.001 to 1% by weight of butylene oxide and 0.001 to 1% by weight of dimethyl formamide.

8. A composition of matter comprising a liquid degreasing chlorinated hydrocarbon containing a synergistically cooperative stabilizing combination composed of small but stabilizing amounts of an epoxide containing between 2 and 10 carbon atoms, selected from the group consisting of unsubstituted aliphatic hydrocarbon epoxides and aliphatic hydrocarbon epoxides containing substituent halogen atoms, and an amide of a one to five carbon atom unsubstituted aliphatic fatty acid containing N-substituents selected from the group consisting of hydrogen, alkyl and polymethylene radicals, said N-substitutents containing a total of not more than 6 carbon atoms.

9. The composition of claim 8 in which the chlorinated hydrocarbon is trichlorethylene.

10. The composition of claim 8 in which the chlorinated hydrocarbon is perchlorethylene.

11. The composition of claim 10 in which the amide is dimethyl formamide.

12. A liquid degreasing chlorinated hydrocarbon composition comprising perchlorethylene containing a synergistically cooperative stabilizing combination composed of 0.001 to 1% by weight of cyclohexene oxide and 0.001 to 1% by weight of dimethyl formamide.

13. A composition of matter comprising perchlorethylene containing a synergistically cooperative stabilizing combination composed of 0.001 to 1% by weight of epichlorhydrin and 0.001 to 1% by weight of dimethyl formamide.

14. A composition of matter comprising perchlorethylene containing a synergistically cooperative stabilizing combination composed of 0.001 to 1% by weight of butylene oxide and 0.001 to 1% by weight of dimethyl formamide.

References Cited in the file of this patent

UNITED STATES PATENTS

| | | |
|---|---|---|
| 2,160,944 | Coleman et al. | June 6, 1939 |
| 2,371,645 | Aitchison | Mar. 20, 1945 |
| 2,595,619 | Voorthuis | May 6, 1952 |